INVENTORS
LE GRAND H. HARDY
GERTRUDE RAND FERREE
M. CATHERINE RITTLER
BY
ATTORNEY

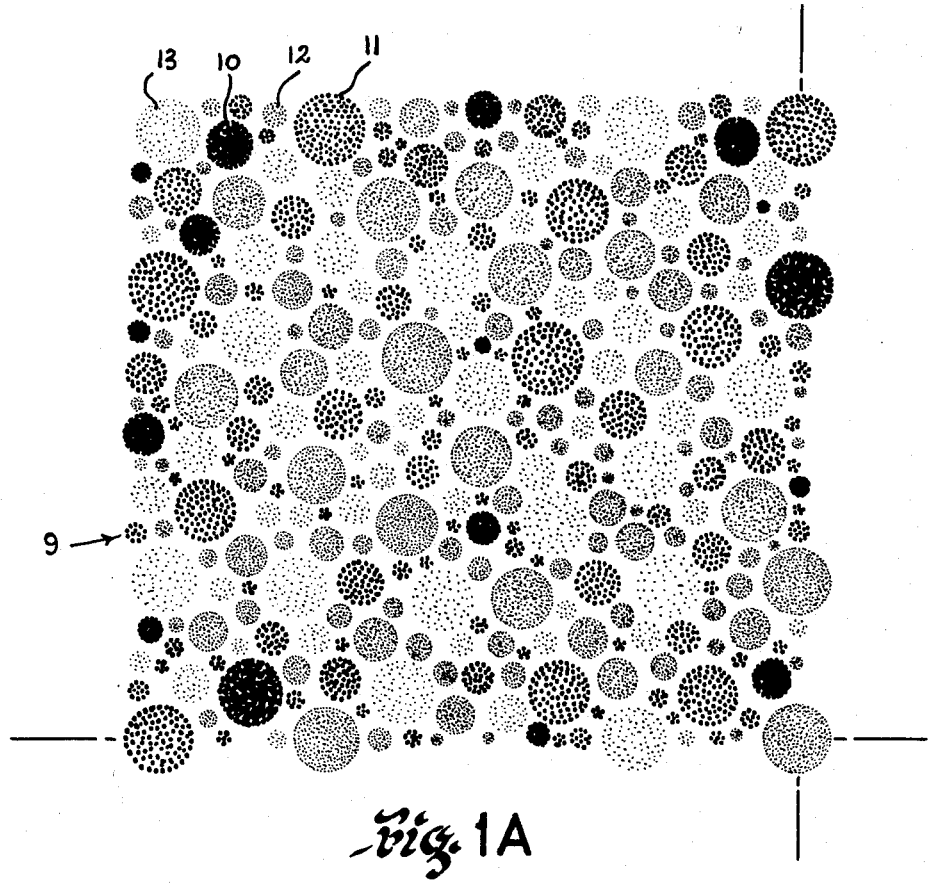
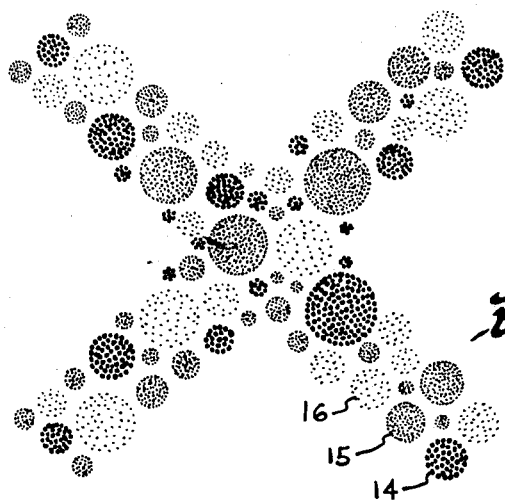

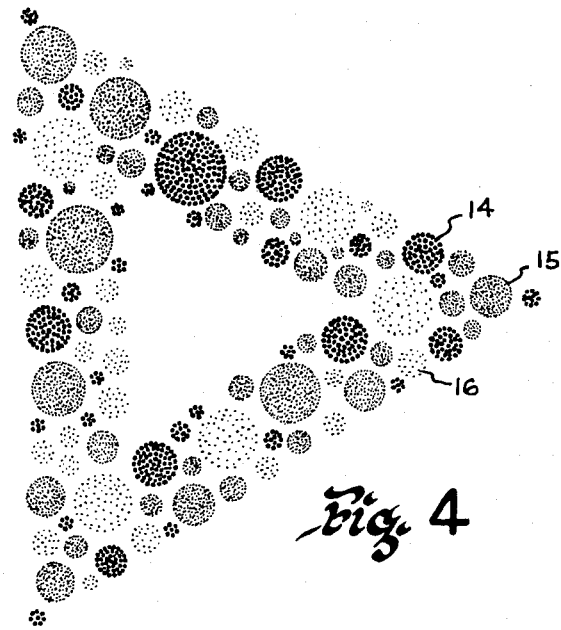
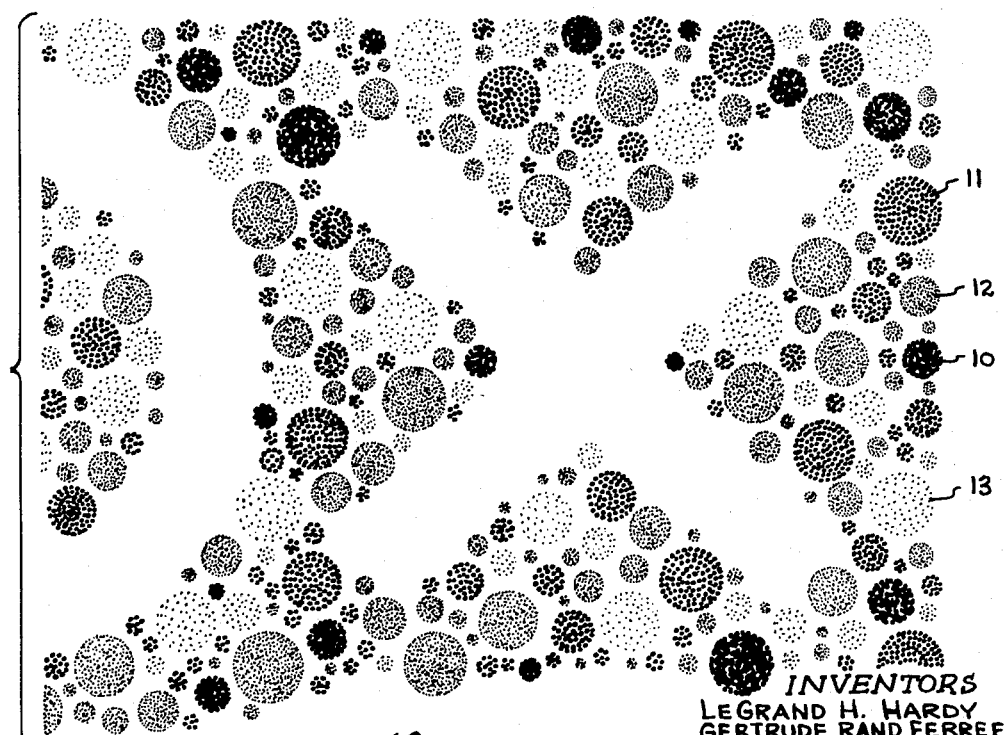

United States Patent Office 2,937,567
Patented May 24, 1960

2,937,567
MEANS FOR DETERMINING COLOR SENSITIVITY

Le Grand H. Hardy, Gertrude Rand Ferree, and Mary Catherine Rittler, New York, N.Y.; Susanna Haigh Hardy, executrix of said Le Grand H. Hardy, deceased, assignor to said Ferree and said Rittler Filed Mar. 1, 1954, Ser. No. 413,117

8 Claims. (Cl. 88—20)

This invention relates to novel eye testing devices and has particular reference to novel means and method of testing visual sensitivity to color.

The prior art teaches various means and methods of testing the visual sensitivity of an individual to color such as by exposing to the view of the individual a series of test charts bearing various patterns such as Arabic numerals, English letters or other commonly known characters which are generally printed upon a selected background in various colors and positions. However, such means and methods have been generally found to be somewhat unsatisfactory due to the fact that it is possible to memorize one or more of the charts from various clues which may be determined from the background. It has been found that such means and methods are also unsatisfactory because individuals may find it possible to determine a particular pattern or character because of a difference in brightness of the color of the pattern in comparison with the brightness of the background and without being able to determine the actual color itself.

Another unsatisfactory aspect of some of the known prior art means and methods is that although color defectives may be screened or separated from normals, it is generally either difficult or impossible to type or classify individuals as to kinds of defects, and to indicate the extent of defect.

Also prior means usually used printing inks containing pigments and the color of these pigments was often of dubious permanence. The base of the inks, by itself changing color with age, frequently modified or vitiated the overall color of the printed portions of the plates or designs.

Therefore, it is one of the primary objects of this invention to overcome the above and other objections to prior art means and methods of testing visual sensitivity to color by providing improved means and method thereof which embodies a series of test charts having a background pattern and test symbols thereon so constructed and arranged as to permit the test symbols to be determined only from perception of the actual colors thereof and preventing individuals from determining said symbols by memorization of modifications in the background pattern or from determining the symbols on the basis of brightness of the colors used.

Another object is to provide improved means and method of testing visual sensitivity to color whereby color defective individuals may be screened or separated from normals and may be typed or classified as to the kinds of color defects which they possess and to the extent of such defects.

Another object is to provide a series of test charts for performing tests of the pseudoisochromatic type utilizing only confusions of color with gray and wherein various hues are selected so as to provide a qualitative analysis of types of color defects, and each hue is presented in a graded series in increasing chroma to indicate the extent of the defects (quantitative diagnoses).

Another object is to provide means and method of testing visual sensitivity to color which embodies four individual categories comprising a demonstration series, a screening series, qualitative and quantitative diagnoses of red-green defects, and qualitative and quantitative diagnoses of blue-yellow defects.

Another object is to provide a series of test charts for testing visual sensitivity to color wherein each of the test charts is provided with a background pattern arrangement of identical chromatic characteristics wherein portions of the pattern differ in size and brightness, the charts being exact duplicates with respect to backgrounds, and each chart having a predetermined quantity of symbols thereon which are merged into the background in predetermined locations and are of selected colors known to be confused with one another and with the colors of the background, the symbols also having portions thereof differing in size and brightness whereby the symbols may be determined by a viewer only upon actual perception of the colors of said symbols.

Another object of the invention is to provide a plurality of charts for use in testing for defective color vision wherein each of the respective charts is provided throughout the effective area thereof with a plurality of specifically arranged dots of differently related sizes arranged to form quadrants or other areas of predetermined shape having substantially identical patterns, said patterns being so correlated as to have no identifiable separations therebetween, portions of said dots in each of said areas being of different sizes and of gray color differing in brightness, certain of said dots, in at least one of said areas, having a given color corresponding in brightness with respect to certain of the correlated gray dots and being so selected as to produce a test symbol having an identifiable form character.

A further object is to provide such test charts wherein the geometrical arrangement of the dots in each area is controlled so that by coloring certain of the dots in any area any one of several simple geometrical designs or symbols may be provided in color without crossing or touching a background gray dot and without presenting any contour edges to furnish clues to the shapes of the colored symbols which, however, may be readily discernible regardless of the orientation of the particular chart being viewed.

A still further object is to provide colored test charts of the above character having stable delicate color control wherein pigments of demonstrated permanence are utilized which are incorporated into bases of proved stability as far as post-printing color changes are concerned.

Other objects and advantages of the invention will become apparent from the following description taken in connection with the accompanying drawings, in which:

Fig. 1A illustrates a portion of a chart embodying the dot arrangement of Fig. 1 and wherein the dots thereof, somewhat enlarged, are differently shaped to indicate different degrees of brightness;

Figs. 2, 3 and 4 are illustrations of test symbols, somewhat enlarged, embodied in the chart arrangement shown in Figs. 1 and 1A; and Fig. 5 is an illustration of a part of the chart arrangement shown in Fig. 1 and in which the dots comprising two of the test symbols have been removed.

The present invention has been developed to overcome the objections and disadvantages of the prior art and improves thereupon in four ways; first, by modifying or developing a background design suitable for duplication throughout the plates or charts of the entire series and which would provide no means whereby an individual defective in visual sensitivity could determine and memorize clues from the geometric design of the background, or from the related positions of the symbols thereon, which would aid in falsifying the test results which should be compiled on the basis of visual sensitivity to color only; second, by improvement in the printing of the test charts or plates whereby the colors of the symbols and of the background are carefully controlled and are provided in different degrees of brightness so that individuals will be unable to discriminate or determine a particular symbol by noting a difference in brightness between the symbol and the background; third, by utilizing pigments of proved color permanence in an ink, the base of which is also of proved color permanence; fourth, by improved administration of the tests whereby more accurate tabulations will result to indicate particular kinds of defects as well as the extent thereof.

Figure 2:
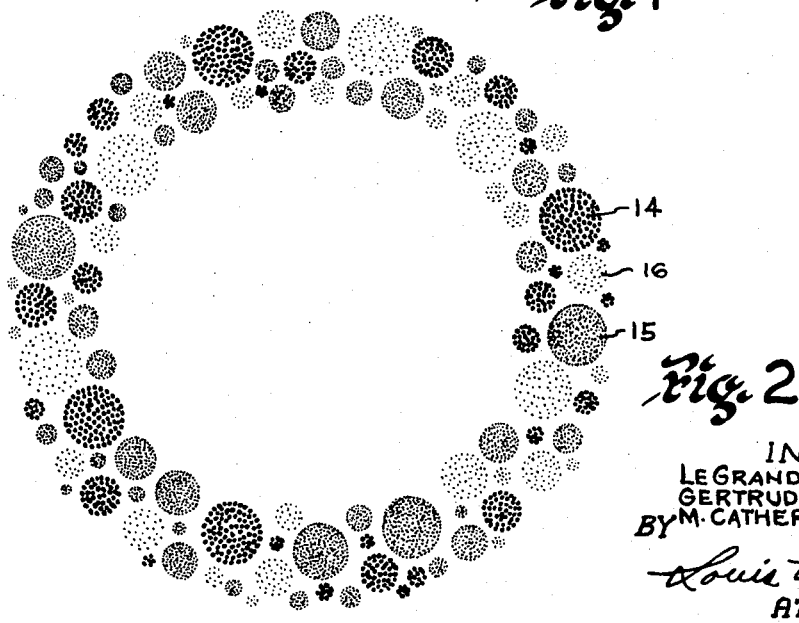

Referring particularly to the design of the charts, it has been found that certain simple geometric symbols are familiar to practically everyone, including foreigners, illiterates and children. Such symbols are the circle, the cross, and the triangle, as shown in Figs. 2, 3 and 4.

Figure 1:
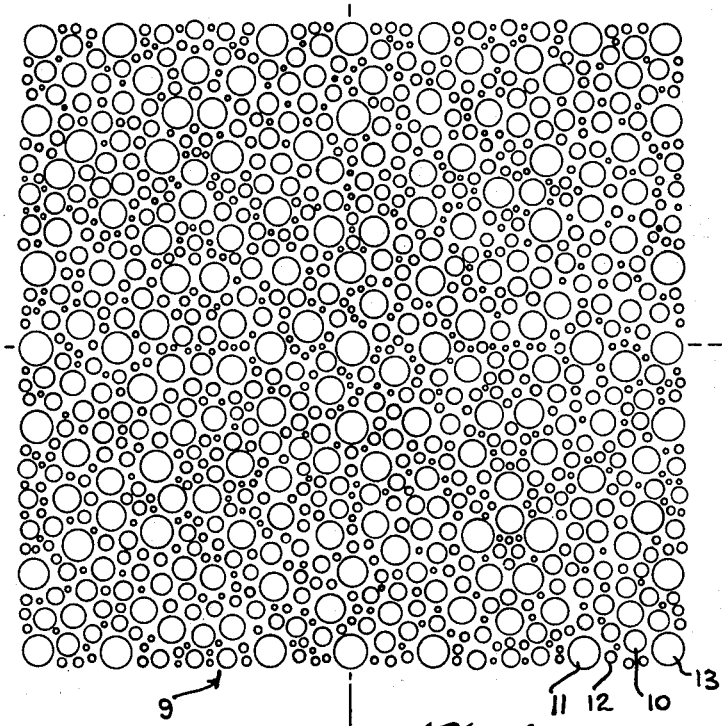
Fig. 1 is a diagrammatic sketch indicating an arrangement of closely related dots of different sizes which may be used in forming a chart embodying the invention.

The preferred background of a chart 9, as shown in Figs. 1 and 1A, is comprised of many dots in closely related arrangement. The dots are of a selected number of different shades as indicated by numerals 10, 11, 12 and 13 and appear to be scattered randomly throughout the chart although actually being arranged in specific relative positions. Each chart 9 is arranged in four quadrants, as indicated by dot-dash lines in Fig. 1, which quadrants are substantially identical with respect to the dots 10–13 therein. The adjoining boundaries of the quadrants, however, are irregular so that no quadrant separations are indicated by relatively straight interspaces. The uniformity of the background pattern in each quadrant is of considerable value in reducing the possibilities of memorization. Also, with this arrangement, the charts can be rotated to any one of four positions.

The dots 10–13 in the charts are, furthermore, arranged so that the test symbols, that is circles, crosses, triangles, squares or other selected symbols, may be embodied in any of the quadrants by coloring certain of the dots therein without requiring any change in the arrangements of the dots or without requiring the symbols to cross or touch a background dot and without presenting any contour edges to furnish a clue to the shape of a colored symbol. More specifically, any one of the selected symbols can be provided in any one of the quadrants. This is shown in Fig. 5 wherein dots representing a circle and a cross in adjoining quadrants have been removed. It is apparent that the circle shown in Fig. 2 and the cross shown in Fig. 3 may be easily located in the blank spaces of Fig. 5 in accordance with this invention. It is to be understood that although each quadrant may contain a symbol if desired, it is preferred that a chart contain not more than two symbols. When two symbols are used they may be located in adjoining quadrants or may be located in diagonally opposed quadrants and it is desirable that charts be provided in both manners. It is also believed advisable to provide some of the charts with only one symbol and at least one chart with no symbol at all.

The background dots 10–13 (Figs. 1, 1A and 5), the dots not included in a symbol, are printed in achromatic colors, that is grays which are lacking in saturation and hue, while the dots 14–16 (Figs. 2, 3 and 4) of the symbols are printed in selected critical hues, perception of the chromatic symbols being stimulated by the achromatic background. The hues are selected so as to provide a qualitative analysis of the type of defect and each hue is presented in a graded series adjusted empirically in increasing chroma to indicate the extent of the defect (quantitative diagnosis). The colors of the dots 14–16 of the symbols are the colors, and their complements, known to be confused with each other and with gray by subjects having different types of defective color vision. If, for example, a pair of symbols of critical colors, designed to trap the various known types of color defective observers, is presented in medium intensity only, as is usually the case in prior art pseudoisochromatic charts, those whose defect is mild may read both symbols while those whose defect is strong may read neither, thus providing no quantitative diagnosis.

It is to be understood that the gray background dots 10–13, as well as the dots 14–16 comprised in the symbols, are all printed in respectively corresponding degrees of brightness. Thus, the background pattern printed in grays supplies achromatic stimuli of both the same and different brightness or value with relation to the colors of the dots of the symbols which are to be discriminated. This feature wherein the brightness characteristics of the colored symbols is adjusted to the background also aids in preventing individuals with slightly variant luminosity curves from determining the outline or form of a symbol on the basis of its brightness as compared to that of the background rather than on the basis of hue and saturation (chroma) alone.

From the above, it is apparent that each test chart comprises a background or field embodying a plurality of similar areas each comprising a plurality of closely related dots of varying values of gray and of varying sizes arranged in controlled relation with each other whereby the areas may be combined to make up the total area of the background or field without leaving any distinguishable line of division between said areas, at least one of the areas having embodied therein test pattern means comprising closely related dots of different sizes simulating the sizes of the adjacent or surrounding gray dots and of varying values of the particular color to be tested, the test pattern dots varying in brightness or values to simulate the values of the adjacent or surrounding gray dots of the field whereby, to a person having low discriminability to the color to be tested, the areas of the test pattern means will be confused with the grays of the adjacent or surrounding closely related areas of the field.

Selection of the actual colors of the symbols have been derived from data which teaches that certain colors and their complements are known to be confused with each other and with gray by subjects having different types of defective color vision. By using these selected colors for the test symbols on the gray background, persons with defective color vision of the different types can be detected. This provides the qualitative aspect of the test. To provide the quantitative aspects of the test the chromatic characteristics of the colored test symbols are adjusted in steps or degrees of saturation.

For example, the charts are preferably printed as a screening series embodying tests for blue-yellow vision and tests for red-green vision, and a second series for determining the type and extent of defect to be used only if there is evidence of defect during the screening process. In the blue-yellow screening tests the symbols are printed in colors which, to a person having defective blue-yellow vision, will appear to blend in chromatically with the gray background. In the red-green screening tests the symbols are printed in colors which will be confused with the gray background by an individual having defective red-green vision. If no errors are made in the screening series, color vision of the individual being tested is normal. If errors are made in the screening series, then the remaining charts are used to determine the type and extent of the defect.

The second test series embody charts wherein the colors of the dots comprising the symbols have been carefully adjusted in steps or degrees of saturation or chroma in order to provide the quantitative aspects of the test.

Eight principal hues are used varying in chroma and value (saturation and brightness) to complete the coloring of the test symbols. Four values of neutral gray are used for the background. The hues and values for the protan and deutan types are carefully adjusted empirically to the average neutral points (under Illuminant CIE-C) of a group of these two types of dichromats. The hues and values for the tritan and tetartan types are also adjusted to the average neutral points for those cases. By this we mean that the specific colors have been controlled so that they fall within the spectral neutral bands (or their complements) of dichromats of the different types of defective color vision. That is, these colors are adjusted so that the given type of color-defective observer will confuse them with the gray background.

For example, we will assume here that a series of tests is provided which embody screening charts designed to separate or detect observers with defects as to red-green and blue-yellow vision. The series of tests also embody a further group of charts which are used to determine the qualitative and quantitative aspects of the individual for those individuals who were found during screening to have defective red-green or blue-yellow vision.

It has been found that by providing the screening charts with colored symbols having relatively low chroma, subjects having defective color vision will make some errors in the screening tests. By providing the symbols in certain charts with colors (having low chroma) known to be confused by protan and deutan types with gray, and by providing the symbols in other charts with colors (having low chroma) known to be confused by tritan and tetartan types with gray, it is apparent that subjects with defective red-green vision or with defective blue-yellow vision can be successfully screened from one another and from subjects with normal vision.

Assuming that a subject during the screening test has made an error, further charts in the series should be administered to him to determine the type of defect and whether the defect be mild, medium or strong. These further charts are comprised of symbols having hues generally similar to the symbols of the screening charts but of increasing chromas for these series. Thus, for each type of anomaly, since the charts are carefully adjusted empirically in each respective saturation series, it is apparent that in administration of these charts a subject with mild defect will probably make few errors in determining test symbols while a subject with strong defect will make a considerably larger number of errors.

Thus, it will be apparent that while a chart having a more saturated symbol may be correctly read by a color defective individual, a chart having a less saturated symbol may be less easily read. Since the entire series of charts is prepared with symbols in colors of varying chroma it is also apparent that a relatively accurate quantitative test may be made to determine fairly accurately the extent of defect of the subject.

It is pointed out here that all of the plates or charts are preferably printed with inks containing no linseed oil and having a base of demonstrated permanence since many such conventional coloring compositions are known to be seriously defective for color vision tests due to the impermanence of the colors.

The tests are preferably made by seating the subject approximately thirty inches from the test charts which are illuminated by 10–60 ft. c. of Illuminant CIE-C or a close approximation, such as the Macbeth Easel Lamp designed for color vision testing.

From the foregoing description it will be apparent that novel means and methods have been provided for testing visual sensitivity to color in accordance with the objects and advantages of this invention. However, it is also apparent that many changes may be made in the details shown and described without departing from the spirit of the invention as expressed in the accompanying claims. Therefore, it is to be understood that all matter set forth or shown in the accompanying claims is to be interpreted as illustrative and not in a limiting sense.

We claim:
1. A device for performing tests of the pseudoisochromatic type comprising a series of test charts each embodying a plurality of closely related areas of similar shapes and of different given sizes and of different given controlled brightnesses arranged in patterns which are identical for each chart and are such that, if said charts were placed in superimposed relation with each other and vision could be obtained therethrough, areas of said charts of identical characteristics as to size, shape and brightness would assume a matched aligned relation with each other, a large number of said closely related areas on each chart being achromatic and of different shades of brightness and others of said areas on each chart being chromatic and of a selected critical hue and of different shades of brightness matching those of the brightness of corresponding aligned achromatic areas of said other charts, all of said achromatic areas of each chart constituting a background and all of said chromatic areas thereof constituting a test symbol whose related color and shades of brightness are so controlled that individuals color-blind as to the color of said chromatic areas will see same as achromatic shades and of brightnesses matching those of the areas of the background, whereby all of said charts will appear identical in pattern and will have the same achromatic appearance to said individuals with no chromatic test symbol being visible therein.

2. A device for performing tests of the pseudoisochromatic type comprising a series of test charts each embodying a plurality of closely related dots of similar shape and of different given sizes and of different given controlled brightnesses, said closely related dots being arranged in patterns which for each chart are of identical size and shape and are in identical relation with each other, a large number of said dots on each chart being achromatic and of different shades of brightness and constituting a background, and other of said dots on each chart being chromatic and of a selected critical hue and of different shades of brightness matching those of the brightness of corresponding aligned dots of said other charts, said chromatic dots of each chart constituting a test symbol adjacent the achromatic dots constituting said background, and whose related color and brightnesses are so controlled that individuals color-blind as to color of said chromatic dots will see same as achromatic shades and of brightnesses matching those of the adjacent achromatic dots of the background, whereby all of said test charts will have the same achromatic appearance to said individuals and will be identical in pattern throughout with no chromatic test symbol being visible therein.

3. A device for performing tests of the pseudoisochromatic type comprising a series of test charts each having four quadrant portions and each quadrant portion employing a plurality of closely related areas of different given sizes and of different given controlled brightnesses, said areas of each quadrant portion being arranged in similar patterns and said quadrant portions having their adjoining boundaries so irregularly formed by said closely related areas that no quadrant separations are indicated by relatively straight interstices between areas, corresponding areas of each chart being substantially identical and such that, if the charts were placed in superimposed relation with each other and vision could be obtained therethrough, the corresponding areas of different charts would assume a matched aligned relationship with each other and would have identical characteristics as to size and brightness, a large number of said related areas on each chart being achromatic and of different shades of brightness, and others of said areas thereon being chromatic and of a selected critical hue and of different shades of brightness matching those of the brightness of corresponding achromatic areas of said other charts, said achromatic areas on each chart constituting a background and said chromatic areas thereon constituting a test symbol; the related colors and brightnesses of the chromatic areas of said test symbols of certain of said test cards being so controlled that individuals color-blind as to the colors of said chromatic areas will see same as achromatic shades and of brightnesses matching those of the areas of the background adjacent thereto, and the related colors and brightnesses of the test symbols of certain of said test charts being so controlled that individuals having deficiencies as to said colors may be detected and the extent of said deficiencies may be determined.

4. A device for performing tests of the pseudoisochromatic type comprising a series of tests charts each embodying a plurality of closely related areas of similar shapes and of different given sizes and of different given controlled brightnesses arranged in patterns which are identical for each chart and are such that, if said charts were placed in superimposed relation with each other and vision could be obtained therethrough, areas of said charts of identical characteristics as to size, shape and brightness would assume a matched aligned relation with each other, a large number of said closely related areas on each chart being achromatic and of different shades of brightness and others of said areas on each chart being chromatic and of a selected critical hue and of different shades of brightness matching those of the brightness of corresponding aligned achromatic areas of said other charts, all of said achromatic areas of each chart constituting a background and all of said chromatic areas thereof constituting a test symbol, the related colors and brightnesses of the chromatic areas of the test symbols of certain of said test charts being so controlled that individuals color-blind as to the colors of said chromatic areas of different test symbols will see areas as achromatic shades of brightness matching those of the areas of the backgrounds adjacent thereto, whereby all of said test charts will have the same achromatic appearance to said individuals and will be identical in pattern throughout with no chromatic test symbol being visible therein.

5. A device for performing tests of the pseudoisochromatic type comprising a series of test charts each embodying a plurality of closely related areas of similar shapes and of different given sizes and of different given controlled brightnesses arranged in patterns which are identical for each chart and are such that, if said charts were placed in superimposed relation with each other and vision could be obtained therethrough, areas of said charts of identical characteristics as to size, shape and brightness would assume a matched aligned relation with each other, a large number of said closely related areas on each chart being achromatic and of different shades of brightness and others of said areas on each chart being chromatic and of a selected critical hue and of different shades of brightness matching those of the brightness of corresponding aligned achromatic areas of said other charts, all of said achromatic areas of each chart constituting a background and all of said chromatic areas thereof constituting a test symbol, the colors of certain of said test symbols being different from the colors of others of said test symbols, the related colors, shapes and brightnesses of the chromatic areas of said test symbols being so controlled that individuals deficient as to said colors will see said areas more nearly achromatically and of brightnesses matching those of the areas of the backgrounds adjacent thereto, the hues of said symbols of said charts being so selected and controlled as to constitute a series of charts providing a quantitative analysis of the type of color deficiencies being tested.

6. A device for performing tests of the pseudoisochromatic type comprising a series of test charts each embodying a plurality of closely related dots of similar shapes and of different given sizes and of different given controlled brightnesses, the dots of each chart being arranged in a pattern, and the patterns of all of said charts being identical to each other, a large number of said dots of each chart being achromatic and of different shades of brightness and constituting a background, and others of said dots of each chart being chromatic and of a selected critical hue and of different shades of brightness matching those of the brightness of corresponding dots of said other charts and constituting a test symbol surrounded by said achromatic dots thereon, the colors of the chromatic dots on certain of said charts being different from those on others of said charts, the related colors and brightnesses of the dots of the test symbols of certain of said charts being so controlled that individuals deficient as to the colors of said chromatic dots will see said dots more nearly achromatically and of brightnesses matching those of the surrounding dots of the background, the test symbols of at least certain of said charts being graded in chroma so as to form a series of charts which is such as to enable quantitative analysis of color blindness.

7. A device for performing tests of the pseudoisochromatic type comprising a series of test charts each embodying a plurality of closely related dots of similar shapes and of different given sizes and of different given controlled brightnesses, the dots of each chart being arranged in a pattern, and the patterns of all of said charts being identical to each other, a large number of said dots of each chart being achromatic and of different shades of brightness and constituting a background, and others of said dots of each chart being chromatic and of a selected critical hue and of different shades of brightness matching those of the brightness of corresponding dots of said other charts, said other dots of said test charts constituting test symbols surrounded by said achromatic dots and at least some of which symbols are of different selected hues, the related colors and brightnesses of the chromatic dots of the test symbols of said test charts being so controlled that individuals deficient as to the colors of certain of said chromatic dots will see same more nearly achromatically and of brightnesses matching those of the surrounding dots of the background, the hues of said symbols being so selected as to enable a qualitative analysis of a selected type of color blindness.

8. A device for performing tests of the pseudoisochromatic type comprising a series of test charts each embodying a plurality of closely related dots of similar shapes and of different given sizes and of different given controlled brightnesses, the dots of each chart being arranged in a pattern, and the patterns of all of said charts being identical to each other, a large number of said dots of each chart being achromatic and of different shades of brightness and constituting a background, and others of said dots of each chart being chromatic and of a selected critical hue and of different shades of brightness matching those of the brightness of corresponding dots of said other charts, said other dots of said test charts constituting test symbols surrounded by said achromatic dots and at least some of which symbols are of different selected hues, the related colors and brightnesses of the chromatic dots of the test symbols of said test charts being so controlled that individuals deficient as to the colors of certain of said chromatic dots will see same more nearly achromatically and of brightnesses matching those of the surrounding dots of the background, the different hues of said symbols being so related and controlled as to enable a qualitative analysis of a selected type of color brightness, and said symbols being further of different controlled graded chromas which are such as to enable quantitative diagnosis of said selected type of color blindness.

References Cited in the file of this patent

UNITED STATES PATENTS

| | | |
|---|---|---|
| 1,118,014 | Jennings | Nov. 24, 1914 |
| 2,328,700 | Wiltberger | Sept. 7, 1943 |
| 2,385,992 | Jobe | Oct. 2, 1945 |
| 2,464,001 | Shepard | Mar. 8, 1949 |

(Other references on following page)

OTHER REFERENCES

The American Weekly magazine (forming part of The Washington Herald and other newspapers), Sunday, May 19, 1935, page 1.

Hardy et al.: article in Archives of Ophthalmology, vol. 35, No. 6 (June 1946). Pages 603–614. Pages 610, 611 and 613, solely relied on.

Hardy et al.: article in Journal of the Optical Society of America; vol. 35, No. 7; July, 1945; pages 481–491.

Bausch and Lomb pamphlet, Standard Practice in the Administration of the Bausch and Lomb Occupational Vision Tests with the Ortho-Rater, dated February 1944; page 10 and next to last photographic plate in pamphlet, solely relied on.

Pseudo-Isochromatic Plates for Testing Color Perception, American Optical Company book, containing 26 plates. Engraved and printed by Beck Engraving Co., Inc., Philadelphia, Pa., 1940.